United States Patent
Gleichenhagen et al.

(10) Patent No.: US 6,590,024 B1
(45) Date of Patent: Jul. 8, 2003

(54) PROCESS TO PRODUCE SEPARATION DISPERSIONS AND THEIR USE

(75) Inventors: Peter Gleichenhagen, Hamburg (DE); Annemarie Müller, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/587,506

(22) Filed: Jun. 5, 2000

(51) Int. Cl.⁷ .................................. C09K 3/00
(52) U.S. Cl. ...................... 524/502; 524/804
(58) Field of Search ................ 524/502, 804

(56) References Cited

U.S. PATENT DOCUMENTS

| | | | |
|---|---|---|---|
| 3,342,625 A | | 9/1967 | Grossman et al. |
| 4,331,718 A | * | 5/1982 | Gleichechagen ............ 427/391 |
| 4,339,246 A | | 7/1982 | Yamamura et al. ............ 44/51 |
| 4,985,469 A | * | 1/1991 | Chip ............................ 521/64 |
| 5,534,579 A | * | 7/1996 | Nikaya ........................ 524/460 |
| 5,624,751 A | | 4/1997 | Spies et al. .................. 428/355 |
| 5,907,011 A | * | 5/1999 | Jakob .......................... 524/524 |

FOREIGN PATENT DOCUMENTS

| | | |
|---|---|---|
| DE | 35 10 324 A1 | 9/1986 |
| EP | 0 619 328 A1 | 10/1994 |

* cited by examiner

Primary Examiner—Edward J. Cain
(74) Attorney, Agent, or Firm—Norris McLaughlin & Marcus

(57) ABSTRACT

Method for producing release agent dispersions for glue-resistant layering on material in the form of surface areas, sheets or strips, especially for the production of surface coatings on the reverse side of pressure sensitive tapes et al, characterized in that copolymers are produced by radical polymerization in an aqueous dispersion from the monomer mixtures described herein.

9 Claims, No Drawings

PROCESS TO PRODUCE SEPARATION DISPERSIONS AND THEIR USE

The present invention is a further development of the method described in DE 28 45 541 and relates to the manufacture of glue-resistant coatings on the reverse side of pressure sensitive adhesive items, which, by a coating with a release layer produced by a hydrous dispersion, exhibits a hydrophobic and glue-resistant surface. These types of coatings are often used in the manufacture of pressure sensitive, adhesive tapes and labels. These items usually consist of a flat carrier material, for example, films, textiles or types of paper that have a pressure sensitive, adhesive coating on one or both sides. In order to protect this coating from sticking together, which is undesirable, it is given a non-adhesive covering until the time of usage. In the case of pressure sensitive, adhesive ribbons/tapes, the reverse side of the carrier material, having been given a non-adhesive finish, can function as a cover. A negative effect on the adhesive layer by a process of diffusion or a reduction of the non-adhesive effect during storage, in particular, through the influence of high temperatures and humidity is not desirable.

In numerous applications using pressure sensitive, adhesive coverings, additional and special demands are placed on the non-adhesive layer on the reverse side. For example, in the case of pressure sensitive, adhesive ribbons/tapes, the non-adhesive layer must have a defined remnant of adhesion to the pressure sensitive, adhesive layer, so that during transport, storage and use the coils remain in place. On the other hand, however, [they must be] sufficiently easy to unwind and cut to length either manually or automatically. Frequently, these types of coatings take on other essential functions for the application at hand. When using textiles as carriers, for example, in the area of wound/injury care, in addition to the release effect, the [need for] a hydrophobic surface that breathes using these types of coatings presents a special requirement. In the case of crepe papers, which are frequently used as the carrier material for cover tapes, reinforcement of the paper is required for the special demands in the paint and varnish industry, in order to increase tear resistance by means of these types of coatings when the tape is wet. In addition, they [are supposed to] protect the surface of the paper against wear and tear caused by rubbing, in both wet and dry conditions. A further requirement is that the non-adhesive coating has to have a firm adhesion for sprayed on paint and varnish formulations, so that drops from the residue of the sprayed on substance does not soil the treated surfaces. The use of release [strata]/films based on organic silicone or fluorine, which are frequently employed in pressure sensitive, adhesive items is undesirable, particularly in this field of the industry.

When one considers that this complex profile of requirements must be met when using the most diverse pressure sensitive, adhesive coatings, then the number of release agents already suggested is understandable.

In U.S. Pat. No. 2,269,712, shellac or nitrocellulose and other cellulose derivatives are suggested for coating the reverse side of pressure sensitive, adhesive cover tapes made out of paper. These types of coatings are not suitable for the present day requirements, because they possess very little non-adhesiveness and therefore it is very difficult to succeed in cutting a specified length from the roll. Besides, these materials are coated with solutions [made] of organic solvents, which is undesirable today for economic and environmental reasons.

U.S. Pat. No. 3,438,794 describes the use of carboxymethylcellulose in a mixture with water soluable salts from aliphatic sulfonic acids with long KW chains for the same purpose. Furthermore, U.S. Pat. No. 2,358,831 teaches the use of soaps and U.S. Pat. No. 2,032,845 the use of wax as release agents. These products are not suitable for present day needs and requirements, because the release effective components, for example soaps or waxes are low molecular substances capable of diffusion, which markedly reduce the adhesion of the various pressure sensitive, adhesive coatings soon after the pressure sensitive, adhesive rolls have been stored for only short periods of time.

In order to avoid these problems, low molecular non-adhesive substances are applied to the surface of the paper according to U.S. Pat. No. 2,803,557 and converted there to polymeric Werner chromium complexes of stearic acid. This process is expensive, causes undesirable color changes and is questionable from a toxicological point of view due to the use of the chromium compounds.

Polymer release agents have been known for a long time. In DE-PS 872 621, copolymer acrylates are described whose release effect is achieved by large quantities of higher homologous forms of acrylic esters. The patent applications DE-AS 1 594 057 and DE-AS 1 300 852 are based on similar raw materials.

Aside from copolymers based on acrylic esters, copolymers made from olefins and vinyl ethers with maleic acid anhydride are also known. The release effect is accomplished by a polymer-analogous conversion of anhydride groups with stearyl alcohol or stearyl amine, as described in DS-AS 1 075 772 and U.S. Pat. No. 3,342,625. U.S. Pat. No. 4,029,843 teaches, for example, to use a copolymer of octadecene or n-hexene with maleic acid anhydride for this purpose.

Polymeric additions are also performed to produce release layers. The polymeric addition of long-chained diamines and/or dioles on diisocyanates is known, as described in U.S. Pat. No. 3,970,599, or the conversion of prepolymers carrying isocyanate groups with hydroxyl groups or amino groups of special organosilicones according to U.S. Pat. No. 3,997,702. In this connection, the conversion of polyvinyl alcohol with stearyl isocynate is also known.

Almost all of the release agents mentioned above are produced in organic solvents and are of little interest today because of the expenses involved and the [requirements of] conditions established for environmental protection. Water-based preparation [methods] are especially desirable in the case of absorbent carrier materials, like crepe papers, which are most frequently used for cover-up, pressure sensitive, adhesive tapes. However, references to water-based systems are seldom found in the literature and usually pertain mostly to secondary dispersions, which have to be produced in an involved manner by removing the solvents. A further disadvantage is the relatively low softening range, which clearly decreases the release effect at high storage temperatures. Finally, the relatively high costs of the raw materials for the higher homologous forms of the corresponding vinyl esters and vinyl ethers that can be polymerized are not advantageous for the practical use of these types of materials. Release agents based on copolymers made of styrene with maleic acid adhydride and a successive polymer-analogous conversion of the anhydride groups with stearyl amine are a good compromise, as described in U.S. Pat. No. 3,342,625 mentioned above. Non-adhesive polymers having softening areas >100° C. with acceptably low raw material costs are produced by this method. The disadvantage, in this case, is that polymerization occurs in aromatic solvents that pose toxicological risks, for example toluene.

DE 28 45 541, mentioned at the beginning, sets forth a further improvement in which release effective copolymers can be produced, through direct emulsion polymerization in an alkaline aqueous medium, that consists of vinyl compounds, for example, styrene with stearyl derivatives of maleic acid, without the use of solvents. In addition, maleic acid anhyride is converted in a preliminary step to maleic acid monostearyl amide with stearyl amine, for example, and then radically polymerized in an aqueous, ammonia solution with a pH of 9. Due to the formation of ammonium salts, the maleic acid monostearyl amide has the capability to act as an emulsifier for the emulsion polymerization. After spreading the polymeric dispersion onto the carrier material and drying at [a temperature] >100° C., a non-adhesive film forms after the ammonia breaks off. In addition, the hydrophilic nature is decreased by the, at least partial, removal of the salt compound, so that the release tape has an additionally strong water-repellant feature, in spite of the high number of carboxyl groups. This method has the disadvantage that large amounts of ammonia are released during the drying process, which is undesirable for environmental reasons, among other reasons. Furthermore, it has been demonstrated that in the case of the claimed emulsion polymerization in the alkaline medium, large numbers of release-effective maleic acid derivatives—for example, maleic acid monostearyl amide—remain in the monomeric form and are not polymerized into the corresponding copolymerisates, for example with styrene. The reason for this is basically that, in the alkaline medium, the maleic acid monoamides or maleic acid monoesters occur as water-soluble salts and therefore a reaction with the water-insoluble comonomers is delayed or impeded. Indeed, release agents that are firmly anchored in the polymeric strata/film, due to good compatibility, promote the release effect. However, a large number of release effective, monomeric components of the release layer is deleterious on the adhesive layer and the release effect when stored at a high temperature or high humidity. Furthermore, during the process of coating paper, large numbers of the polymerically emulsified particles can penetrate the fiber [structure] and become ineffective for the release effect.

Accordingly, the object of the invention was to produce release agents on the basis of copolymers produced in an aqueous dispersion using maleic acid anhydride derivatives not having the disadvantages mentioned above.

DESCRIPTION OF THE INVENTION

The release dispersions for adhesive-resistant coatings produced according to the invention consist of copolymers of maleic acid monoamides or maleic acid monoesters with, for example, styrene, vinyl acetate, vinyl ether, olefines, (meth-)acrylates or a mixture of these, produced by radical polymerization in an aqueous dispersion. Using maleic acid monoamides or maleic acid monoesters with carbon groups of 14–18 carbon atoms as main components is preferred. Particular preference is given to copolymers [made] of maleic acid monoamides with styrene because of their high glass transition phase. In order to increase the release effect, other additional release effective monomers can be polymerized, for example, (meth-)acrylic acid stearyl ester.

The mole ratios of the monomeric composition are chosen, in regard to styrene/maleic acid derivatives, preferably in the range of 1/1, however, especially in the case of a combination with other co-monomers, the ratio can deviate considerably from this.

After drying on the carrier materials, for example, crepe papers, the polymer tapes demonstrate a release effect, the character of which can be directly affected by the polymer composition. For a sufficient adhesion of the paint/varnish residues drying [on the surface], the release dispersions can also be diluted with less release-effective, film-forming, hydrous lattices to reduce the release effect. Polymer lattices based on styrene/butadiene, which can be more or less strongly carboxylated and in both wet and dry conditions are very compatible with the release dispersions, are particularly wellsuited for this. In this situation then, the proportion of the mixture can be widely varied, independent of the specific application. The additional flexibility aimed for with this measure and the improved film formation is beneficial for the handling and the protection of the carrier material against damage from water penetration, for example, from colors in the dispersions. Flexibility can also be achieved from polymerization with monomers that increase flexibility like vinyl ethers or olefines, which can also be employed individually as comonomers. Compounds from these [types of] materials when present in the gas phase, at room temperature, —for example isobutane—, can be employed advantageously in great overabundance, since the remaining monomers that are not polymerized after the alternating copolymerization with the maleic acid derivatives are very easily recovered by distillation. The diesters and diester amides of maleic acid or fumaric acid can also be polymerized to a lesser extent, so that with a suitable choice of monomers from the class of substances mentioned above, the profile of characteristics for the release-effective copolymers can be widely varied.

The dispersions according to the invention are produced by radical polymerization, preferably in a neutral or acidic aqueous medium, whereby no alkalis or very small quantities of alkalis, for example ammonia, are used. The monomer mixture is finely dispersed in water in a polymerization reactor, in particular, at temperatures of 60–90° C. in liquid form by means of dispersion disks/wheels or other dispersing stirrers. In order to establish the particle size and to stabilize the monomeric dispersion, water-soluble polymers are added, preferably polyvinyl alcohols in a mixture with polyvinyl pyrrolidone and anionic emulsifiers from the class of substances of ethoxylating fatty alcohols in an-aqueous phase. For the production of the dispersions, according to the invention, this combination of stabilizing substances has proven itself to be effective and beneficial. The use of single components from the class of substances mentioned, on their own, has generally led to unsatisfactory results. The concentration of the hydrophilic stabilizers, taken together in relation to the amount of monomers, especially, must not exceed approximately 8 parts by weight. Higher concentrations disturb the hydrophobic surface of the release film produced and facilitate water penetration. The pH value can be established in the range of 3–9 by adding small amounts of alkaline substances, preferably ammonia, as needed. In this way, the increased negative charge of the particles is stabilized, in addition, against agglomeration. Anionic emulsifiers can also be used, however, they are not indispensable in achieving stabilization. The radical polymerization is implemented, in particular, by way of the pearl polymerization mechanism, where particles preferably in the range of 1 $\mu$m–70$\mu$m are produced. The ranges of particle size between 3$\mu$m–50$\mu$m are particularly preferred. These particle sizes allow the production of smooth or rough release layers with a defined surface roughness, dependent on the range of particle size. Rough surfaces can form a markedly smaller connecting surface, comparatively, than they would with smooth release coatings in contact with pressure sensitive, adhesive films/tapes. In this way, the lease effect is increased and the negative influence from disruptive substances capable of diffusion between the layers is decreased.

Moreover, when the particle size is larger, the undesirable penetration of release effective substance into the fiber structure of the papers or textiles is, for the most part, hindered and the adhesion of varnishes or applied paints is increased. On the other hand, it is easier to print on smoother release layers and they are easier to work with for manual applications.

Controlling the distribution of particle size is possible, primarily, by way of the combination and concentration of the stabilizers and the monomers. Even the number of rotations and the geometry of the stirrer have an influence, even if only a subordinate one, on the particle size. Moreover, the radical concentration produced by the initiators and the solubility of the substances forming the radicals have considerable influence. In this way, for example, water soluble initiators like ammonium peroxide sulfate in the presence of emulsifiers which form micelles can produce, in addition to the bead polymerization, distinctly smaller polymer particles with circumferences <1 µm, corresponding to the mechanism of the emulsion polymerization. Emulsifiers from release effective monomers, for example, maleic acid mono-stearyl amide, can also be suitable for this by adding small amounts of soaps produced from ammonia.

In order to produce a large portion of the smaller sized particles, these types of emulsifiers, alone, can suffice for the stabilization. In order to firmly establish the larger particles by imbedding them into the carrier material during the drying process, it is desirable to have a smaller portion of the emulsion polymerisate which is turning into film with small-sized particles [present]. This is especially the case when, in order to achieve a very strong release effect, dilution with a film-forming latex has not been planned.

In the event that cross-linking of the polymer is desired, it can be produced, for example, by polymerization of di-vinyl benzol or other poly-unsaturated compounds. Thermal cross-linking during film formation is also possible with the usual methods of cross-linking dispersion polymers, for example, by polymerization of N-methylol acrylamide or admixtures like zinc acetate and other cross-linkers customary for dispersion polymers containing carboxylic groups.

Polymerization can proceed in a time span of approximately 4 hours, at monomer concentrations between 10–60 parts by weight, preferably in the range of 25–40 parts by weight, in a temperature range of approximately 60–90° C., using radical-forming substances that are soluble in the monomer mixture and/or are water soluble In order to attain a particularly economical production of the release dispersions, the synthesis of release effective maleic acid monoamides or maleic acid monoesters can be implemented in a preliminary step in the polymerization reactor. To do this, the reaction substance, for example, stearyl amine and maleic acid anhydride in styrene, which for this addition reaction, at first, is merely used as a solvent and is sufficiently inhibited against undesirable polymerization, is converted to maleic acid monostearyl amide and is heated to a clear solution. Next, the aqueous phase and the stabilizers are added, the monomers are dispersed and polymerized after reaching the reaction temperature. Throughout this [process], it can be beneficial, in order to control the exothermy and to produce narrow particle size distribution, to provide only a portion of the copolymers for the preliminary step, in this example, styrene. The portion that is reserved is added in doses after or during the polymerization of the monomer mixture produced in the preliminary step.

The dispersions obtained can be spread onto the carrier materials and dried to layers as they are, or with further admixtures such as moistening aids, foam-resistors, thickening agents, or film forming substances. The usual thickness of layers is found in the range of approximately 3–10 g/m².

The invention is elucidated in the following examples:

EXPERIMENTAL PART

Example 1

In a 21-4-necked glass reaction flask, supplied with dispersion wheel (circumference of 8 cm), reflux cooler, nitrogen supply pipe, thermometer and dosage device, 91.9 gr. of styrene =0.88 moles (purity >99%, stabilized with 0.005% 4-tert-butylcatechol), 79.2 gr of maleic acid anhydride =0.808 moles (purity >99%) and 215.2 gr. distilled stearyl amine =0.8 mole (Arneen 18 D , the Akzo Nobel company) are heated while stirring to a temperature of 85° C., until a clear solution of the reaction product, maleic acid monostearyl amide in styrene is formed.

Next, a solution of

| | | |
|---|---|---|
| 5.13 gr. polyvinyl pyrrolidone (Luviskol K90, BASF) | =1.33% of the monomer mixture | |
| 3.86 gr. polyvinyl alkohol (G04/140 Wacker company) | =1.00% | |
| 12.85 gr. ethoxyl. fatty alcohol (Lutensol AT 50 BASF) | =3.335 | | is added in doses to 828 gr. di-ionized water =67% of the total amount while stirring (500 r.p.m.) and the resulting mixture is heated for 30 minutes, keeping the stirring r.p.m. constant and supplying nitrogen, to a temperature of 83° C., until a homogenous dispersion of the monomers results.

After this, the polymerization is initiated by adding a dose of 23.3 gr. of a 5% aqueous solution of ammonium peroxodisulfate. The reaction temperature increases within 20 minutes to 87° C. After exceeding the maximum temperature, another dose of 46.6 gr. of the initiator solution is added within 30 minutes and the polymerization is completed at 84° C. within the total reaction time of 4 hours.

| | | |
|---|---|---|
| Residue monomer: | maleic acid monostearyl amide (high perf. liqu. chrom.) | 2.4% of the polymer |
| | styrene (gas chrom.) | 0.1% |
| particle circumference: (light microscope) | 95% | 6–15 |
| pH 4 | | |
| viscosity at 24.2° C.: | 0.88 Pa s at shear speed | 10 l/s (Mettler RM 180 measuring beaker1 spindle 2) |
| solid material: | 33% mole ratio styrene/maleic acid monostearyl amide in the solid material 1.1/1. | |

Example 2

In a polymerization apparatus, analogous to Example 1, 87.0 gr. of stearyl amine with 32.0 gr. maleic acid anhydride in 60.0 gr. of styrene are converted to a clear solution of maleic acid monsterayl amide in styrene. Then, 533 gr. of diionozed water is added, in which 1.33% polyvinyl pyrrolidone (Luviskol K90 BASF), 1% polyvinyl alcohol (Polyviol GO4/140 Wacker) and 3.3% ethox. fatty alcohol (Lutensol AT 50 BASF) relative to the total monomer amount are dissolved, and the mixture is heated to 83° C. while stirring (500 r.p.m.) the initiation of polymerization occurs as described in Example 1 by adding 0.5% (relative to the monomer) ammonium peroxodisulfate in the form of a 5% aqueous solution. During the polymerization process, another 60 gr. of styrene and 0.5% (relative to the monomer) of initiator are added after passing the maximum temperature of 89° C. within a time period of 40 minutes. After this, the polymerization is completed at 83° C., within the remaining 3 hours.

| Residue monomer: | maleic acid monostearyl amide (high perf. liqu. chrom.) | 1.8% relative to polymer |
|---|---|---|
| | styrene (gas chrom.) | 0.1% |
| particle circumference: | 95% | 15–7-$\mu$m (light microscope) |
| pH value 4 | | |
| viscosity at 24.2° C.: | 0.98 Pa s at shear speed 10 l/s (Mettler RM 180 measuring beaker 1 spindle 2). | |
| Solid substance: | 30.7% mole ratio styrene/maleic acid monostearyl amide in the solid substance 3.5/1. | |

Example 3

Comparison Test with Polymerization in an Alkaline Medium

The reaction procedure from Example 2 is repeated with the following changes:

1. The admixtures of polyvinyl alcohol, polyvinyl pyrrolidone and ethoxylized fatty alcohol are left out.
2. The pH value of the aqueous phase is established at 9.5 with concentrated ammonia before the initiation of the polymerization and a monomer emulsion is produced by homogenization of the mixture without adding stabilizers. These are polymerized, as in Example 2, by dosing afterwards with styrene.
   residue monomer: maleic acid monostearyl amide 15.4% rel. to the polymer (HPLC)
   styrene 0.08% (GC)
   particle circumference: 95% <1 $\mu$m
   pH value 9
   viscosity at 24.2° C.: 0.155 Pa s at shear speed 10 1/s (Mettler RM 180 measuring beaker 1 spindle 2)
   solid substance: 30% mole ratio styrene/maleic acid monostearyl amide in the solid substance 3.5/1

Example 4

In a 21-4-necked glass reaction flask, which—varying from Example 1—is fitted with 3 beam stirring elements arranged crosswise, one over the other, for mixing dispersions of high viscosity, 104.1 gr. (1 mole) of styrene (purity and stabilization corresponding to Example 1), 73.4 gr. maleic, acid monostearyl amide (0.4 mole) and 162.1 gr. methacrylic acid stearyl ester (0.5 mole) are heated while stirring to a temperature of 82° C., giving a clear solution. Then, 827 gr. of diionized water is added in which 3.5 gr. polyvinyl pyrrolidone (see Example 1), 2.7 gr. polyvinyl alcohol (see Example 1) and 8.8 gr. ethox. fatty alcohol (see Example 1) have been dissolved. [This solution] is mixed with the monomers and heated to a temperature of 82° C. with a stirring speed of 500 r.p.m. until a homogenous dispersion is reached. The polymerization is started by dosing with 17 ml of an aqueous 10% solution of ammonium peroxidisulfate. The temperature rises to approximately 90° C. with rapidly increasing viscosity.

After about 10 minutes, the viscosity drops again and the reaction is completed at 82° C., after dosing with another 17 ml of the initiator solution, within a total reaction time of approximately 4 hours.

| Residue monomer: | maleic acid monstearyl amide (high perf. liqu. chrom.) | 1.8% rel. to the polymer |
|---|---|---|
| | methacrylic acid stearyl ester (high perf. liqu. chrom.) | 1.1% rel. to the polymer |
| | styrene | 0.1% (gas. chrom.) |
| particle circumference: | 95% | 7–30[1] $\mu$m (light microscope) |
| pH value 3–4 | | |
| viscosity at 24.2° C.: | 0.1 Pa s at shear speed 10 l/s (Mettler RM 180 measuring beaker 1 spindle 2) | |
| solid substance: | 30.3% | |

[1]Translator's note: the original German reads 7.30 $\mu$m, I am assuming the dash was erroneously left out.

What is claimed is:

1. A method for producing a release agent dispersion capable of being used for glue-resistant layering on a substrate, said method comprising producing release effective copolymers by radical polymerization in an aqueous dispersion in acidic or neutral medium from the following monomers:
   a) 10–90 parts by weight, relative to the total weight of the monomers, of at least one release effective component selected from the group consisting of one or more maleic acid monoamides or maleic acid monoesters or the corresponding fumaric acid derivatives, having carbon-hydrogen groups with chain lengths of 12–32 carbon atoms;
   b) 15–85 parts by weight, relative to the total weight of the monomers, of at least one comonomer selected from the group consisting of styrene, olefin, vinyl ether, vinyl ester, and (meth)acrylate derivatives and mixtures of these comonomers, wherein the proportion of said comonomer or mixtures thereof occurs in an amount that suffices for a copolymerization with the maleic (fumaric) acid derivatives and can also contain release effective monomers; and
   c) 0.5–20 parts by weight, relative to the total weight of the monomers, of polyunsaturated compounds or monomers cross-linked over functional groups.

2. The method according to claim 1, wherein the monomers comprise:
   a) 30–80 parts by weight, relative to the total weight of the monomers, of at least one release effective component selected from the group consisting of one or more maleic acid monoamides or maleic acid monoesters or the corresponding fumaric acid derivatives, having carbon-hydrogen groups with chain lengths of 14–18 carbon atoms;
   b) 10–70 parts by weight, relative to the total weight of the monomers, of at least one comonomer selected from the group consisting of styrene, olefin, vinyl ether, vinyl ester, and (meth)acrylate derivatives and mixtures of these comonomers, wherein the proportion of said comonomer or mixtures thereof occurs in an amount that suffices for a copolymerization with the maleic (fumaric) acid derivatives and can also contain release effective monomers; and c) 1–10 parts by weight, relative to the total weight of the monomers, of polyunsaturated compounds or monomers cross-linked over functional groups.

3. The method according to claim 2, wherein the release effective component is selected from maleic acid monoamide alone, and maleic acid monoamide in admixture with maleic acid monoester, wherein the maleic acid monoamide is optionally substituted by an amount of up to one third fumaric acid diester or maleic acid diester.

4. The method according to claim 1, wherein water soluble stabilizers in the form of polyvinyl alcohols, polyvinyl pyrrolidones and anionic emulsifiers are used for the production of the dispersions.

5. The method according to claim 4, wherein the water soluble stabilizers comprise mixtures of polyvinyl alcohols, polyvinyl pyrrolidones and ethoxylated fatty alcohols, which is employed in an amount of up to 8 parts by weight relative to the polymers.

6. The method according to claim 1, wherein the polymerization is produced in the form of a bead polymerization in an acidic or neutral medium.

7. The method according to claim 6, wherein the polymerization is produced in the form of a bead polymerization in an acidic or neutral medium, and a particle size of 3 $\mu$m–50 $\mu$m is obtained.

8. A method for producing a substrate to which at least one layer of a release agent dispersion has been applied, said method comprising the following steps:

a) producing a release agent dispersion according to the method of claim 1; and b) applying said release agent dispersion as at least one layer on a substrate.

9. The method according to claim 8, wherein the substrate is a pressure-sensitive adhesive tape.

* * * * *

UNITED STATES PATENT AND TRADEMARK OFFICE
CERTIFICATE OF CORRECTION

PATENT NO.    : 6,590,024 B1
DATED         : July 8, 2003
INVENTOR(S)   : Gleichenhagen et al.

It is certified that error appears in the above-identified patent and that said Letters Patent is hereby corrected as shown below:

Title page,
Insert item:
-- [30]   Foreign Application Priority Data
June 9, 1999    Germany (DE)    199 26 169.5 --

Signed and Sealed this

Twentieth Day of April, 2004

JON W. DUDAS
*Acting Director of the United States Patent and Trademark Office*